United States Patent
Wang et al.

(10) Patent No.: US 11,962,376 B2
(45) Date of Patent: Apr. 16, 2024

(54) MULTI-CHANNEL BEAMFORMING METHOD AND APPARATUS, AND STORAGE MEDIUM

(71) Applicant: Huawei Technologies Co., Ltd., Shenzhen (CN)

(72) Inventors: Yinbo Wang, Chengdu (CN); Zhong Huang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 522 days.

(21) Appl. No.: 17/211,403

(22) Filed: Mar. 24, 2021

(65) Prior Publication Data
US 2021/0211172 A1   Jul. 8, 2021

Related U.S. Application Data

(63) Continuation of application No. PCT/CN2019/107626, filed on Sep. 25, 2019.

(30) Foreign Application Priority Data

Sep. 25, 2018 (CN) .......................... 201811117083.7

(51) Int. Cl.
  H04B 7/06   (2006.01)
  H04B 7/0408 (2017.01)
  H04B 7/10   (2017.01)

(52) U.S. Cl.
  CPC ......... H04B 7/0617 (2013.01); H04B 7/0408 (2013.01); H04B 7/0695 (2013.01); H04B 7/10 (2013.01)

(58) Field of Classification Search
  CPC .. H04B 7/0617; H04B 7/0408; H04B 7/0695; H04B 7/10
(Continued)

(56) References Cited

U.S. PATENT DOCUMENTS

5,274,381 A    12/1993  Riza
9,685,702 B2 *  6/2017  Hu ....................... H04B 7/0617
(Continued)

FOREIGN PATENT DOCUMENTS

CA   2978489 C  *  8/2021 ............. H01Q 1/246
CN   102640352 A    8/2012
(Continued)

OTHER PUBLICATIONS

3GPP TR 37.842 V1.11.0 (May 2016), 3rd Generation Partnership Project; Technical Specification Group Radio Access Network; E-UTRA and UTRA; Radio Frequency (RF) requirement background for Active Antenna System (AAS) Base Station (BS) (Release 13), R4-164272, 87 pages.

*Primary Examiner* — Mong-Thuy T Tran
(74) *Attorney, Agent, or Firm* — Slater Matsil, LLP

(57) ABSTRACT

Embodiments of this application provide a multi-channel beamforming method and apparatus. The method includes: determining a target downlink positive polarization beam and a target downlink negative polarization beam based on M preset weight sets, where each weight set includes a phase weight set and an amplitude weight set, different weight sets include a same amplitude weight set, different weight sets include different phase weight sets, and both a quantity of phase weights in the phase weight set and a quantity of amplitude weights in the amplitude weight set are determined based on a quantity of a plurality of channels, where M is an even number greater than 0; and obtaining a target downlink signal based on the target downlink positive polarization beam and the target downlink negative polarization beam.

18 Claims, 10 Drawing Sheets

(58) Field of Classification Search
USPC .......................................................... 370/329
See application file for complete search history.

(56) References Cited

U.S. PATENT DOCUMENTS

| | | | |
|---|---|---|---|
| 10,050,681 B2* | 8/2018 | Kim | ................. H04B 7/088 |
| 10,511,379 B2* | 12/2019 | Miller | ................ H04B 7/18543 |
| 10,734,722 B2* | 8/2020 | Hu | ................. H04B 7/0469 |
| 2004/0043795 A1 | 3/2004 | Zancewicz | |
| 2007/0099578 A1 | 5/2007 | Adeney et al. | |
| 2017/0338874 A1 | 11/2017 | Pratt et al. | |
| 2018/0077284 A1* | 3/2018 | Nam | ................. H04L 65/80 |
| 2018/0198513 A1 | 7/2018 | Petersson et al. | |
| 2023/0199784 A1* | 6/2023 | Deenoo | ............... H04W 72/046 |
| | | | 370/329 |

FOREIGN PATENT DOCUMENTS

| | | | | |
|---|---|---|---|---|
| CN | 103650370 A | | 3/2014 | |
| CN | 103700952 A | | 4/2014 | |
| CN | 106712864 A | | 5/2017 | |
| CN | 106936479 A | | 7/2017 | |
| CN | 107947842 A | | 4/2018 | |
| CN | 108234037 A | | 6/2018 | |
| CN | 113747560 A | * 12/2021 | ............. H04B 17/11 |
| EP | 1182799 A2 | | 2/2002 | |
| EP | 3221978 B1 | * 8/2018 | ........... H04B 7/0417 |
| EP | 3416243 A1 | * 12/2018 | ............. H01Q 1/246 |
| EP | 4021066 A1 | * 6/2022 | ........... H04B 7/0486 |
| WO | WO-2016005003 A1 | * 1/2016 | ........... H04B 7/0413 |
| WO | WO-2017153732 A1 | * 9/2017 | ........... H04B 7/0452 |

* cited by examiner

MULTI-CHANNEL BEAMFORMING METHOD AND APPARATUS, AND STORAGE MEDIUM

CROSS-REFERENCE TO RELATED APPLICATIONS

This application is a continuation of International Application No. PCT/CN2019/107626, filed on Sep. 25, 2019, which claims priority to Chinese Patent Application No. 201811117083.7, filed on Sep. 25, 2018. The disclosures of the aforementioned applications are hereby incorporated by reference in their entireties.

TECHNICAL FIELD

Embodiments of this application relate to antenna technologies, and in particular, to a multi-channel beamforming method and apparatus, and a storage medium.

BACKGROUND

In a multi-channel scenario, coherence between signals on co-polarization channels causes beamforming. If beamforming is not controlled, network coverage and a network capacity may be affected. An actual beamforming effect is highly correlated with a phase. Generally, phase alignment needs to be performed to achieve an expected beamforming effect, that is, obtain an expected pattern.

In the current technology, phase alignment is performed on a transmit channel, and an optimal phase is selected based on machine learning and feedback from a live network, to obtain a beam matching the live network, thereby obtaining a capacity gain while ensuring network coverage.

However, in the foregoing method, phase alignment generally needs to be implemented at relatively high costs. For example, in a common scenario of a plurality of antennas plus a radio frequency module, a phase alignment range can include only a radio frequency port, but cannot include an antenna port. In this way, phase alignment cannot be performed on a path from the radio frequency port to the antenna port, resulting in an uncertain pattern. For another example, when phase alignment is performed on a radio frequency module with no calibration loop, a calibration loop needs to be constructed. This makes phase alignment more complex.

SUMMARY

Embodiments of this application provide a multi-channel beamforming method and apparatus, and a storage medium, to ensure network coverage in a multi-channel scenario when no phase alignment is performed.

According to a first aspect, an embodiment of this application provides a multi-channel beamforming method, including: determining a target downlink positive polarization beam and a target downlink negative polarization beam based on M preset weight sets; and then, obtaining a target downlink signal based on the target downlink positive polarization beam and the target downlink negative polarization beam. Each weight set includes a phase weight set and an amplitude weight set. Different weight sets include a same amplitude weight set, different weight sets include different phase weight sets, and both a quantity of phase weights in the phase weight set and a quantity of amplitude weights in the amplitude weight set are determined based on a quantity of a plurality of channels. M is an even number greater than 0.

In the foregoing embodiment, a downlink positive polarization beam and a downlink negative polarization beam are orthogonal through downlink positive and negative polarization beam pairing, to ensure network coverage in a multi-channel scenario when no phase alignment is performed.

In a possible implementation, the determining a target downlink positive polarization beam and a target downlink negative polarization beam based on M preset weight sets may include the following substeps.

Substep 1. Perform beamforming on a to-be-transmitted signal based on the M preset weight sets, to obtain M beams. The M preset weight sets include N positive polarization weight sets and N negative polarization weight sets. A positive polarization weight set includes a positive polarization phase weight set, and a negative polarization weight set includes a negative polarization phase weight set. Each positive polarization weight set corresponds to one positive polarization beam, and each negative polarization weight set corresponds to one negative polarization beam. M is twice N.

Substep 2. Calculate a sum of DPCCH transmit powers of all users corresponding to each of the M beams. A sum of DPCCH transmit powers of all users corresponding to the positive polarization beam is a sum of positive polarization DPCCH transmit powers, and a sum of DPCCH transmit powers of all users corresponding to the negative polarization beam is a sum of negative polarization DPCCH transmit powers.

Substep 3. Determine a beam corresponding to a smallest sum of positive polarization DPCCH transmit powers in N sums of positive polarization DPCCH transmit powers as the target downlink positive polarization beam.

Substep 4. Determine, based on the target downlink positive polarization beam and N sums of negative polarization DPCCH transmit powers, the target downlink negative polarization beam paired with the target downlink positive polarization beam.

In a possible implementation, the determining, based on the target downlink positive polarization beam and N sums of negative polarization DPCCH transmit powers, the target downlink negative polarization beam paired with the target downlink positive polarization beam may be specifically: determining a beam corresponding to a smallest sum of negative polarization DPCCH transmit powers in the N sums of negative polarization DPCCH transmit powers as a first beam; and determining the target downlink negative polarization beam based on a positive-negative polarization orthogonal requirement, the first beam, and the target downlink positive polarization beam.

In a possible implementation, the determining a target downlink positive polarization beam and a target downlink negative polarization beam based on M preset weight sets may include: periodically scanning uplink beams; determining energy values of all users on the uplink beams in each periodicity, where the energy values include an uplink positive polarization energy value and an uplink negative polarization energy value; determining a target uplink positive polarization beam and a target uplink negative polarization beam based on the energy values and a positive-negative polarization orthogonal requirement; and determining the target downlink positive polarization beam and the target downlink negative polarization beam respectively based on the target uplink positive polarization beam and the target uplink negative polarization beam.

In a possible implementation, the determining a target uplink positive polarization beam and a target uplink negative polarization beam based on the energy values and a positive-negative polarization orthogonal requirement may include: determining a beam corresponding to a largest uplink positive polarization energy value in N uplink positive polarization energy values as the target uplink positive polarization beam; determining a beam corresponding to a largest uplink negative polarization energy value in N uplink negative polarization energy values as a second beam; and determining the target uplink negative polarization beam based on the target uplink positive polarization beam, the positive-negative polarization orthogonal requirement, and the second beam.

Further, before the obtaining a target downlink signal based on the target downlink positive polarization beam and the target downlink negative polarization beam, the method may further include: dynamically selecting, through beam codeword reusing and based on a user scheduling priority, a user for scheduling. The beam codeword reusing is used to indicate that positive and negative polarization beams in a same cell use different codewords.

In some embodiments, the dynamically selecting, through beam codeword reusing and based on a user scheduling priority, a user for scheduling may include: determining, based on the user scheduling priority, a first to-be-scheduled user currently having a highest priority; calculating, as a first energy value, an energy value that corresponds to the first to-be-scheduled user and that is received on the target uplink positive polarization beam; calculating, as a second energy value, an energy value that corresponds to the first to-be-scheduled user and that is received on the target uplink negative polarization beam; when a difference between the first energy value and the second energy value is greater than or equal to a first preset value, determining a second to-be-scheduled user currently having a second highest priority; calculating, as a third energy value, an energy value that corresponds to the second to-be-scheduled user and that is received on the target uplink positive polarization beam; calculating, as a fourth energy value, an energy value that corresponds to the second to-be-scheduled user and that is received on the target uplink negative polarization beam; and when a difference between the third energy value and the fourth energy value is less than or equal to a second preset value, determining to simultaneously schedule the first to-be-scheduled user and the second to-be-scheduled user on the target downlink positive polarization beam and the target downlink negative polarization beam.

According to a second aspect, an embodiment of this application provides a multi-channel beamforming apparatus, including: a determining module, configured to determine a target downlink positive polarization beam and a target downlink negative polarization beam based on M preset weight sets, where each weight set includes a phase weight set and an amplitude weight set, different weight sets include a same amplitude weight set, different weight sets include different phase weight sets, both a quantity of phase weights in the phase weight set and a quantity of amplitude weights in the amplitude weight set are determined based on a quantity of a plurality of channels, and M is an even number greater than 0; and a beamforming module, configured to obtain a target downlink signal based on the target downlink positive polarization beam and the target downlink negative polarization beam.

Based on a same inventive concept, because a problem-resolving requirement of the apparatus corresponds to the solution in the method design of the first aspect, for an implementation of the apparatus, refer to the implementation of the method. Repeated descriptions are not described again.

The multi-channel beamforming apparatus may be a base station.

According to a third aspect, an embodiment of this application provides a multi-channel beamforming apparatus, including a memory and a processor. The memory is configured to store program code. The processor invokes the program code, and when the program code is executed, the processor is configured to perform the method according to any one of the first aspect.

The multi-channel beamforming apparatus may be a base station.

According to a fourth aspect, an embodiment of this application provides a computer readable storage medium. The computer readable storage medium stores a computer program, and when the computer program is executed by a processor, the method according to any one of the first aspect is implemented.

In a possible design, functions of the determining module and the beamforming module in this embodiment of this application may be specifically implemented by a processor of a corresponding network device.

According to a fifth aspect, an embodiment of this application provides a program. When the program is executed by a computer, any method described above is performed.

All or a part of the program may be stored in a storage medium packaged with the processor, or may be stored in a memory that is not packaged with the processor.

Optionally, the processor may be a chip.

According to a sixth aspect, an embodiment of this application provides a computer program product, including a program instruction. The program instruction is used to implement any method described above.

According to a seventh aspect, an embodiment of this application provides a chip, including a processing module and a communications interface. The processing module can perform any method described above.

Further, the chip further includes a storage module (for example, a memory). The storage module is configured to store an instruction. The processing module is configured to execute the instruction stored in the storage module, and execution of the instruction stored in the storage module enables the processing module to perform any method described above.

These aspects or other aspects of this application are more concise and understandable in the description of the following (a plurality of) embodiments.

DETAILED DESCRIPTION OF ILLUSTRATIVE EMBODIMENTS

It should be understood that the term "and/or" in this specification describes only an association relationship for describing associated objects and represents that three relationships may exist. For example, A and/or B may represent the following three cases: Only A exists, both A and B exist, and only B exists.

Multi-channel beamforming means that when a signal is transmitted on a plurality of channels, if a feature phase is set for the signal, an amplitude of the signal can form an expected coherent effect on an air interface. Specifically, signal energy is stronger in some directions, and is weak in some directions, to achieve an expected beam "deformation" effect.

The embodiments of this application may be applied to cellular mobile communications systems of various standards, including but not limited to: a global system for mobile communications (GSM), a code division multiple access (CDMA) system, a wideband code division multiple access (WCDMA) system, a general packet radio service (GPRS) system, a universal mobile telecommunications system (UMTS), a long term evolution (LTE) system and an evolved system thereof, a universal terrestrial radio access network (UTRAN) system, and a new radio (New Radio, NR) system. In addition, the embodiments of this application may further be applied to another communications system in which a plurality of signal sources provide a wireless service for a terminal device.

Figure 1:
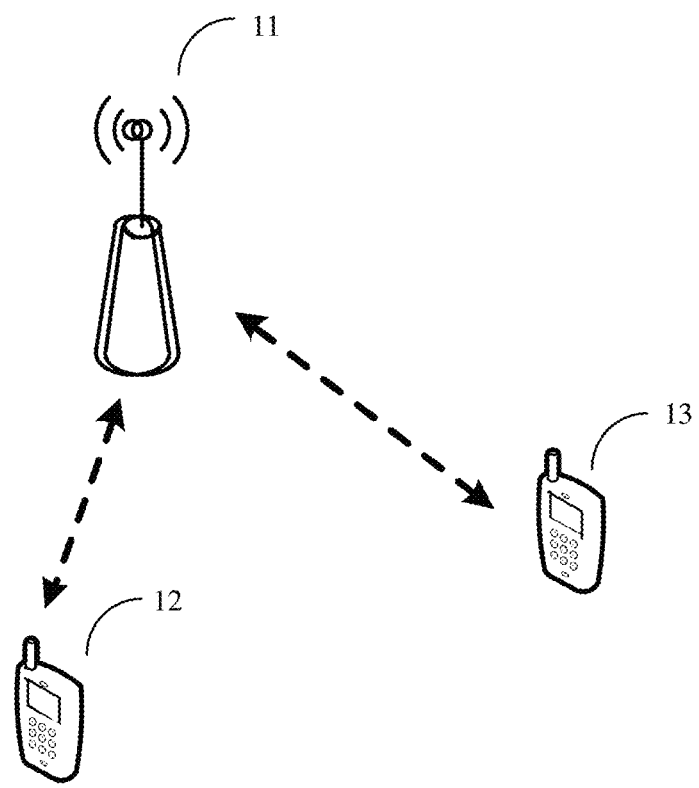
FIG. 1 is a schematic diagram of a communications system according to an embodiment of this application.

FIG. 1 is a schematic diagram of a communications system according to an embodiment of this application. As shown in FIG. 1, the communications system includes a network device 11 and at least one terminal device. Herein, two terminal devices are used as an example for description. The two terminal devices are respectively a terminal device 12 and a terminal device 13. The terminal device 12 and the terminal device 13 are located within coverage of the network device 11 and communicate with the network device 11, to implement the technical solutions provided in the following embodiments of this application.

The terminal device 12 and the terminal device 13 are collectively referred to as a terminal device herein. The terminal device may be alternatively referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device, another processing device connected to a wireless modem, a vehicle-mounted device, a wearable device, or a terminal device in a next generation communications system, for example, a terminal device in a 5th generation communications (5G) network, a terminal device in a future evolved public land mobile network (PLMN) network, or a terminal device in an NR system.

The network device 11 may be an access point (AP) in a WLAN, or a base transceiver station (BTS) in GSM or CDMA, or may be a NodeB (NB) in WCDMA, or may be an evolved Node B (eNB or eNodeB) in LTE, a regeneration station or an access point, a base station controller (RNC) in UTRAN, or a vehicle-mounted device, a wearable device, a network device in a future 5G network, a network device in a future evolved PLMN network, a new generation node B (gNodeB) in an NR system, or the like.

Figure 2:
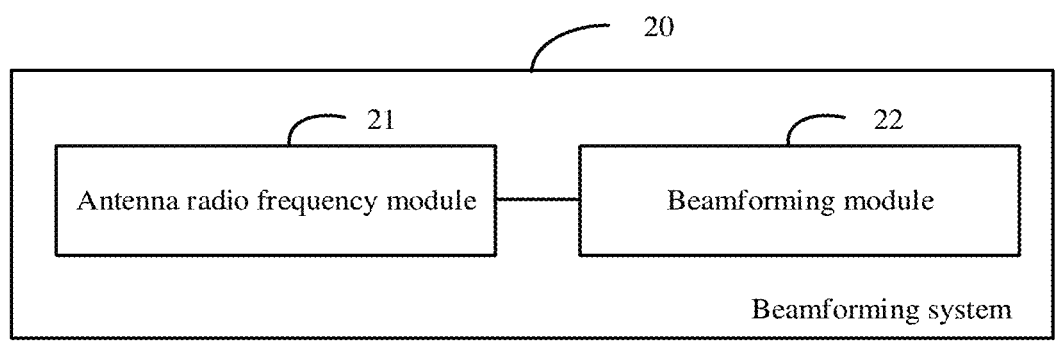
FIG. 2 is a schematic diagram of a beamforming system according to an embodiment of this application.

FIG. 2 is a schematic diagram of a beamforming system according to an embodiment of this application. As shown in FIG. 2, the beamforming system 20 includes an antenna radio frequency module 21 and a beamforming module 22 coupled to the antenna radio frequency module 21.

The antenna radio frequency module 21 is configured to generate a to-be-transmitted signal, and send the to-be-transmitted signal to the beamforming module 22. The beamforming module 22 is configured to perform beamforming on the to-be-transmitted signal based on M preset weight set, to obtain a target downlink signal. Alternatively, the antenna radio frequency module 21 is configured to scan an uplink beam, and send the scanned uplink beam to the beamforming module 22. The beamforming module 22 is configured to determine a target downlink beam based on the uplink beam and through uplink and downlink beam pairing, to obtain a target downlink signal.

The beamforming system 20 may be implemented by using the network device 11 shown in FIG. 1. It may be understood that the beamforming system 20 is built in the network device 11 or the beamforming system 20 is the network device 11. In addition, the beamforming system 20 may be implemented by using software and/or hardware.

Figure 3:
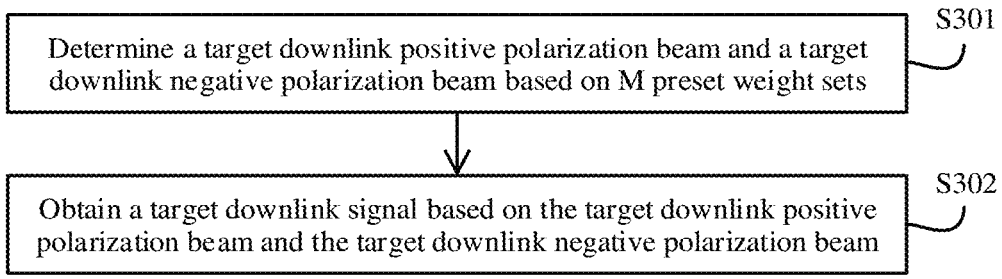
FIG. 3 is a flowchart of a multi-channel beamforming method according to an embodiment of this application.

The following describes, with reference to the accompanying drawings, a multi-channel beamforming method provided in the embodiments of this application FIG. 3 is a flowchart of a multi-channel beamforming method according to an embodiment of this application. For example, the multi-channel beamforming method may be performed by the beamforming system 20 shown in FIG. 2. Referring to FIG. 3, the multi-channel beamforming method includes the following steps.

S301. Determine a target downlink positive polarization beam and a target downlink negative polarization beam based on M preset weight sets.

Each weight set includes a phase weight set and an amplitude weight set. Different weight sets include a same amplitude weight set, different weight sets include different phase weight sets, and both a quantity of phase weights in the phase weight set and a quantity of amplitude weights in the amplitude weight set are determined based on a quantity of a plurality of channels. M is an even number greater than 0.

For example, a value of M is 2, and the two weight sets are respectively represented as a weight set A1 and a weight set A2. The weight set A1 includes an amplitude weight set {X11, X12, X13, X14} and a phase weight set {Y11, Y12, Y13, Y14}. The weight set A2 includes an amplitude weight set {X21, X22, X23, X24} and a phase weight set {Y21, Y22, Y23, Y24}. It may be understood that the amplitude weight set {X11, X12, X13, X14} is the same as the amplitude weight set {X21, X22, X23, X24}, but the phase weight set {Y11, Y12, Y13, Y14} is different from the phase weight set {Y21, Y22, Y23, Y24}.

In actual application, when multi-channel beamforming needs to be performed on a to-be-sent downlink signal, the beamforming system 20 generates a to-be-transmitted signal by using the antenna radio frequency module 21, and performs S301 by using the beamforming module 22, to perform pairing between a downlink positive polarization beam and a downlink negative polarization beam that are orthogonal. The target downlink positive polarization beam and the target downlink negative polarization beam are paired and are orthogonal.

S302. Obtain a target downlink signal based on the target downlink positive polarization beam and the target downlink negative polarization beam.

For example, the beamforming system 20 performs S302 by using the beamforming module 22, to obtain the target downlink signal.

A downlink positive polarization beam and a downlink negative polarization beam are orthogonal through downlink positive and negative polarization beam pairing, and a combined beam is basically the same as coverage of a common antenna, so that it can be ensured that network coverage is not affected.

In this embodiment of this application, first, the target downlink positive polarization beam and the target downlink negative polarization beam are determined based on the M preset weight sets, and then, the target downlink signal is obtained based on the target downlink positive polarization beam and the target downlink negative polarization beam. Each weight set includes the phase weight set and the amplitude weight set, different weight sets include a same amplitude weight set, different weight sets include different phase weight sets, and both the quantity of phase weights in the phase weight set and the quantity of amplitude weights in the amplitude weight set are determined based on the quantity of the plurality of channels. M is an even number greater than 0. A downlink positive polarization beam and a downlink negative polarization beam are orthogonal through downlink positive and negative polarization beam pairing, to ensure network coverage in a multi-channel scenario when no phase alignment is performed.

Figure 4:
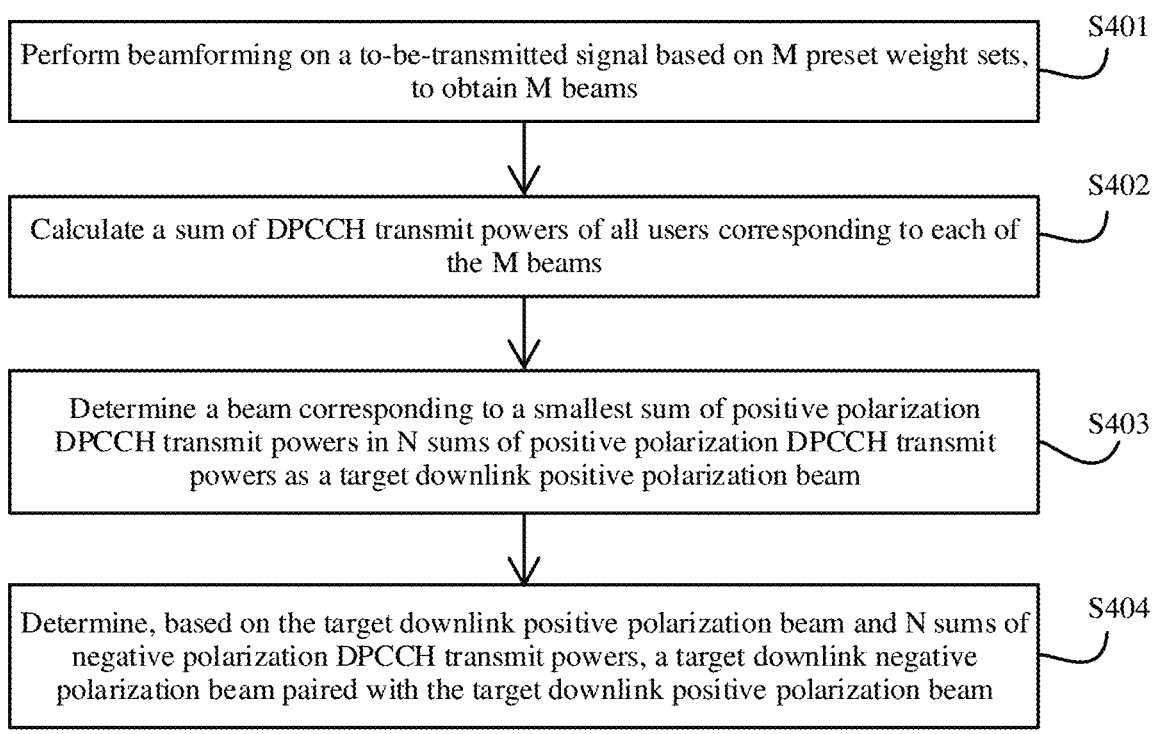
FIG. 4 is a flowchart of a multi-channel beamforming method according to another embodiment of this application.

Based on the foregoing embodiment, in a possible implementation, as shown in FIG. 4, S301 of determining the target downlink positive polarization beam and the target downlink negative polarization beam based on the M preset weight sets may include the following substeps:

S401. Perform beamforming on a to-be-transmitted signal based on the M preset weight sets, to obtain M beams.

The M preset weight sets include N positive polarization weight sets and N negative polarization weight sets. A positive polarization weight set includes a positive polarization phase weight set, and each positive polarization weight set corresponds to one positive polarization beam. A negative polarization weight set includes a negative polarization phase weight set, and each negative polarization weight set corresponds to one negative polarization beam. M is twice N.

S402. Calculate a sum of dedicated physical control channel (DPCCH) transmit powers of all users corresponding to each of the M beams.

A sum of DPCCH transmit powers of all users corresponding to the positive polarization beam is a sum of positive polarization DPCCH transmit powers, and a sum of DPCCH transmit powers of all users corresponding to the negative polarization beam is a sum of negative polarization DPCCH transmit powers.

S403. Determine a beam corresponding to a smallest sum of positive polarization DPCCH transmit powers in N sums of positive polarization DPCCH transmit powers as the target downlink positive polarization beam.

S404. Determine, based on the target downlink positive polarization beam and N sums of negative polarization DPCCH transmit powers, the target downlink negative polarization beam paired with the target downlink positive polarization beam.

Optionally, the step may be specifically: determining a beam corresponding to a smallest sum of negative polarization DPCCH transmit powers in the N sums of negative polarization DPCCH transmit powers as a first beam; and determining the target downlink negative polarization beam based on a positive-negative polarization orthogonal requirement, the first beam, and the target downlink positive polarization beam.

The following describes the multi-channel beamforming method in the foregoing embodiment by using a specific example.

Figure 5:
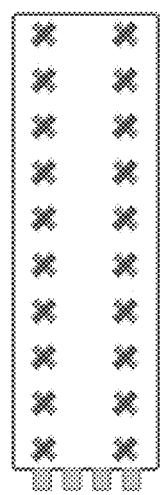
FIG. 5 is a schematic structural diagram of an antenna according to an embodiment of this application.

For ease of description, a 2-column 4-port antenna is used as an example for description. A schematic diagram of the 2-column 4-port antenna is shown in FIG. 5.

A 360-degree circle is equally divided into n parts (for ease of description, n=8), and eight phase values, namely, 0, 45, 90, 135, 180, 225, 270, and 315, are provided.

An antenna pattern is highly correlated with a phase. When an amplitude remains unchanged, the pattern is determined only by the phase. On a single channel, a phase is introduced to a remote radio unit (RRU), a feeder, a jumper, an antenna, and the like. The RRU is an active component, and the phase changes in a time dimension. The other components are passive components, and the phases are stable in a time dimension. Therefore, the antenna pattern is in a steady state in a short time periodicity (depending on a phase drift speed of the RRU). An intra-polarization phase difference may be changed by using a baseband and an extra phase, to adjust the pattern.

In a particular periodicity (for example, one hour), a phase difference between positive polarization and negative polarization is adjusted, and a range of an adjusted value includes eight phase values, namely, 0, 45, 90, 135, 180, 225, 270, and 315. Then, DPCCH transmit powers of all users are measured for each pattern, and sequencing is performed based on sums of the DPCCH transmit powers of all users, as shown in Table 1.

Referring to Table 1, for positive polarization, when a phase difference is 45 degrees, a sum of positive polarization DPCCH transmit powers is the smallest. Therefore, the phase difference is selected for the target downlink positive polarization beam. Further, a negative polarization phase difference needs to be selected for pairing with the positive polarization.

Figure 6A:
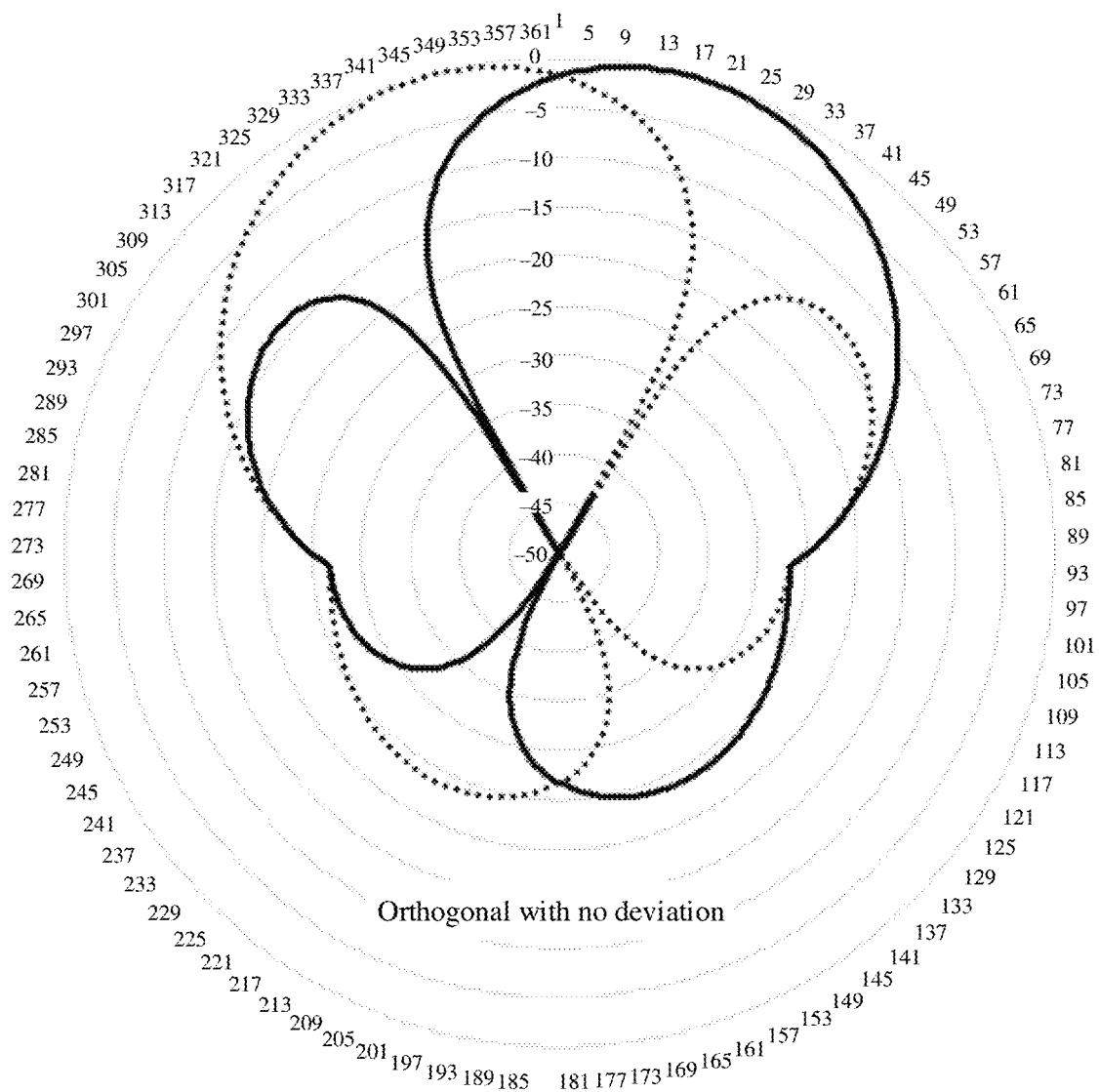
FIG. 6A is a schematic diagram of a pattern according to an embodiment of this application.
Figure 6B:
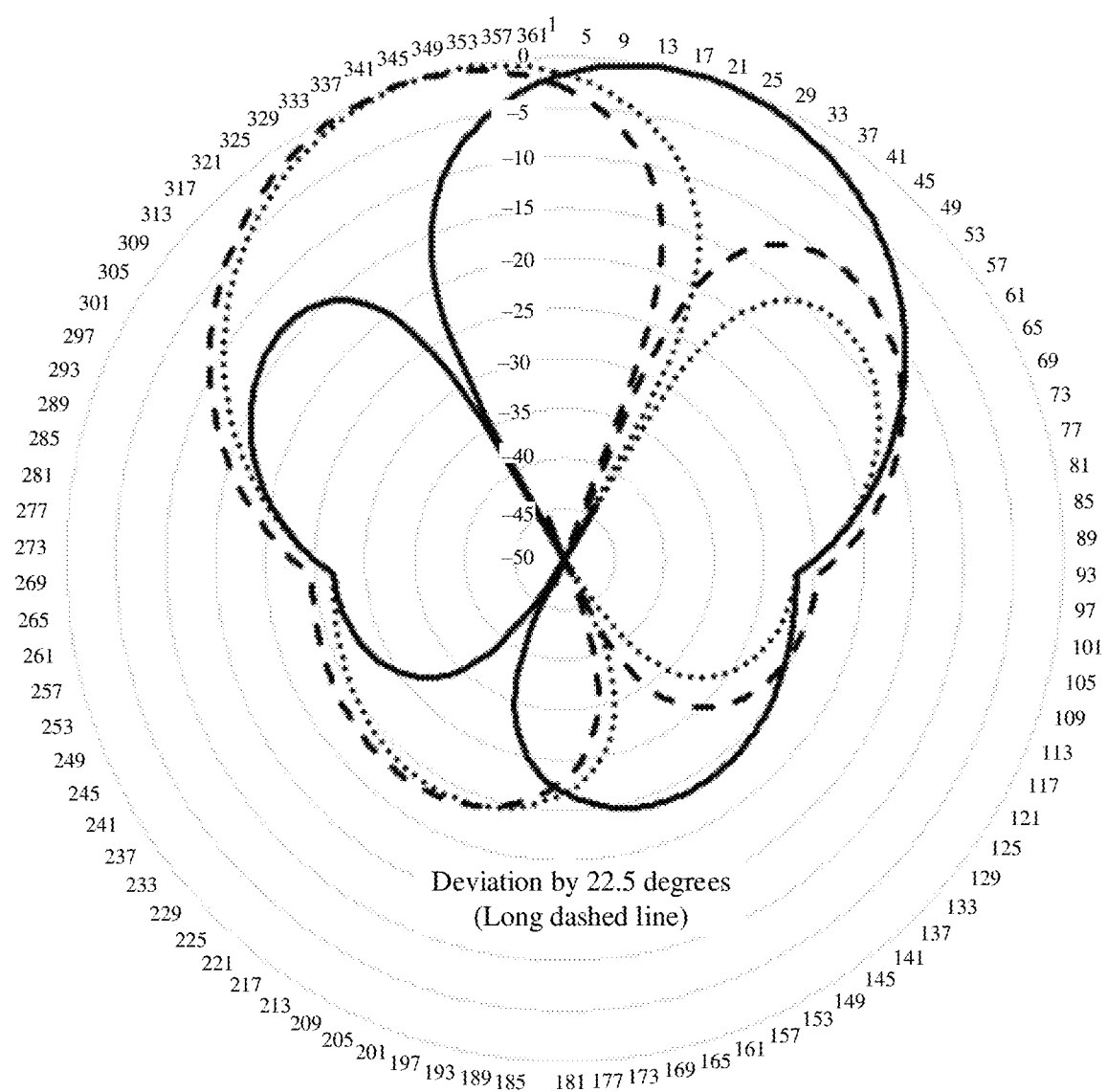
FIG. 6B is a schematic diagram of a pattern according to an embodiment of this application.

It can be learned that for negative polarization, when a phase difference is 90 degrees, a sum of negative polarization DPCCH transmit powers is the smallest. It may be equivalently considered that for a same sector, patterns enabling sums of DPCCH transmit powers to be the smallest do not greatly differ from each other. Therefore, for negative polarization, when a phase difference (90+180)=270 is selected, best orthogonality with a phase difference of 90 degrees is achieved and best orthogonality with a pattern corresponding to a positive polarization phase difference of 45 degrees is achieved. In this way, a downlink positive polarization beam is paired with a downlink negative polarization beam (a beam 2 is selected for positive polarization, and a beam 7 is selected for negative polarization). After pairing, positive and negative polarization patterns are shown in FIG. 6A and FIG. 6B. FIG. 6A shows that positive polarization and negative polarization are completely orthogonal and complementary. In actual application, there may be a deviation of a particular degree between positive polarization and negative polarization. The deviation is related to equal division of the 360-degree circle. For example, if the 360-degree circle is equally divided into eight parts, a largest deviation is 22.5 degrees, referring to FIG. 6B. If a smaller deviation is needed, the 360-degree circle may be divided into more parts. In FIG. 6A and FIG. 6B, a solid line represents a positive polarization pattern, and a dotted line represents a negative polarization pattern.

TABLE 1

| | Eight patterns | | | | | | | |
|---|---|---|---|---|---|---|---|---|
| Phase difference | 0 | 45 | 90 | 135 | 180 | 225 | 270 | 315 |
| Normal sequence number | 1 | 2 | 3 | 4 | 5 | 6 | 7 | 8 |
| Positive polarization (sequenced in ascending order of sums of DPCCH transmit powers) | 2 | 1 | 5 | 6 | 3 | 8 | 7 | 4 |
| Negative polarization (sequenced in ascending order of sums of DPCCH transmit powers) | 3 | 2 | 6 | 7 | 4 | 1 | 8 | 5 |

Figure 7:
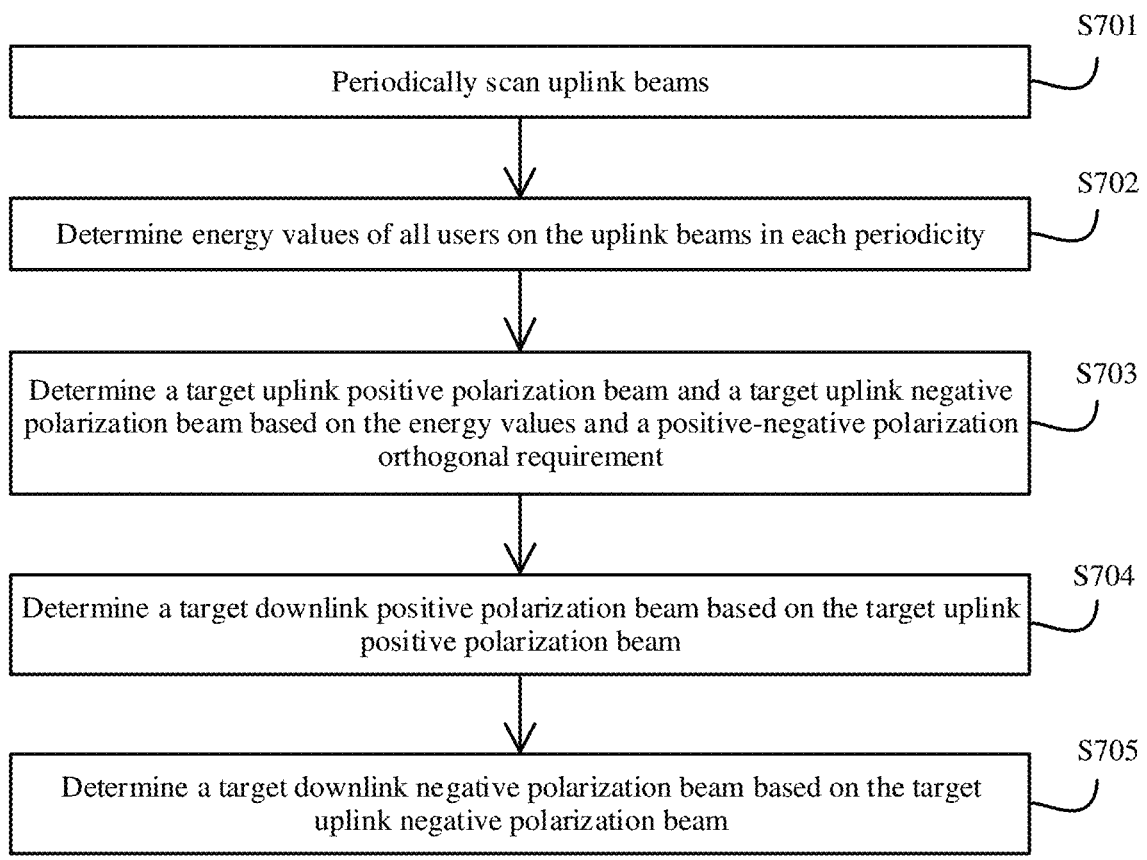
FIG. 7 is a flowchart of a multi-channel beamforming method according to still another embodiment of this application.

In another possible implementation, as shown in FIG. 7, S301 of determining the target downlink positive polarization beam and the target downlink negative polarization beam based on the M preset weight sets may include the following substeps.

S701. Periodically scan uplink beams.

S702. Determine energy values of all users on the uplink beams in each periodicity.

The energy values include an uplink positive polarization energy value and an uplink negative polarization energy value.

S703. Determine a target uplink positive polarization beam and a target uplink negative polarization beam based on the energy values and a positive-negative polarization orthogonal requirement.

S704. Determine the target downlink positive polarization beam based on the target uplink positive polarization beam.

S705. Determine the target downlink negative polarization beam based on the target uplink negative polarization beam.

The uplink beams are used only for measuring uplink energy values (Eb values), and energy values of all users on the uplink beams in a periodicity are obtained by periodically scanning the uplink beams, and then the target uplink positive polarization beam and the target uplink negative polarization beam are determined based on the energy values and the positive-negative polarization orthogonal requirement. Then, the downlink beams (including the target downlink positive polarization beam and the target downlink negative polarization beam) can be determined through uplink and downlink beam pairing, and a DPCCH of a downlink beam does not need to be measured frequently, where frequent measurement affects downlink coverage.

In this embodiment, beam selection is performed through uplink and downlink beam pairing. Compared with the current technology, downlink beam selection can be implemented without relying on phase alignment.

In some embodiments, S703 of determining the target uplink positive polarization beam and the target uplink negative polarization beam based on the energy values and the positive-negative polarization orthogonal requirement may include: determining a beam corresponding to a largest uplink positive polarization energy value in N uplink positive polarization energy values as the target uplink positive polarization beam; determining a beam corresponding to a largest uplink negative polarization energy value in N uplink negative polarization energy values as a second beam; and determining the target uplink negative polarization beam based on the target uplink positive polarization beam, the positive-negative polarization orthogonal requirement, and the second beam.

It may be understood that for uplink and downlink beam pairing, uplink beams are sequenced based on measurement values (for example, Eb values), and downlink beams are sequenced based on measurement values (for example, sums of DPCCH transmit powers). Then, pairing is performed on an uplink beam and a downlink beam based on uplink and downlink sequencing results.

Description is provided still by using an example in which a 360-degree circle is equally divided into n parts (for ease of description, n=8), and eight phase values, namely, 0, 45, 90, 135, 180, 225, 270, and 315, are provided. Eight phase values are equivalent to that eight beams are preset.

Figure 8:
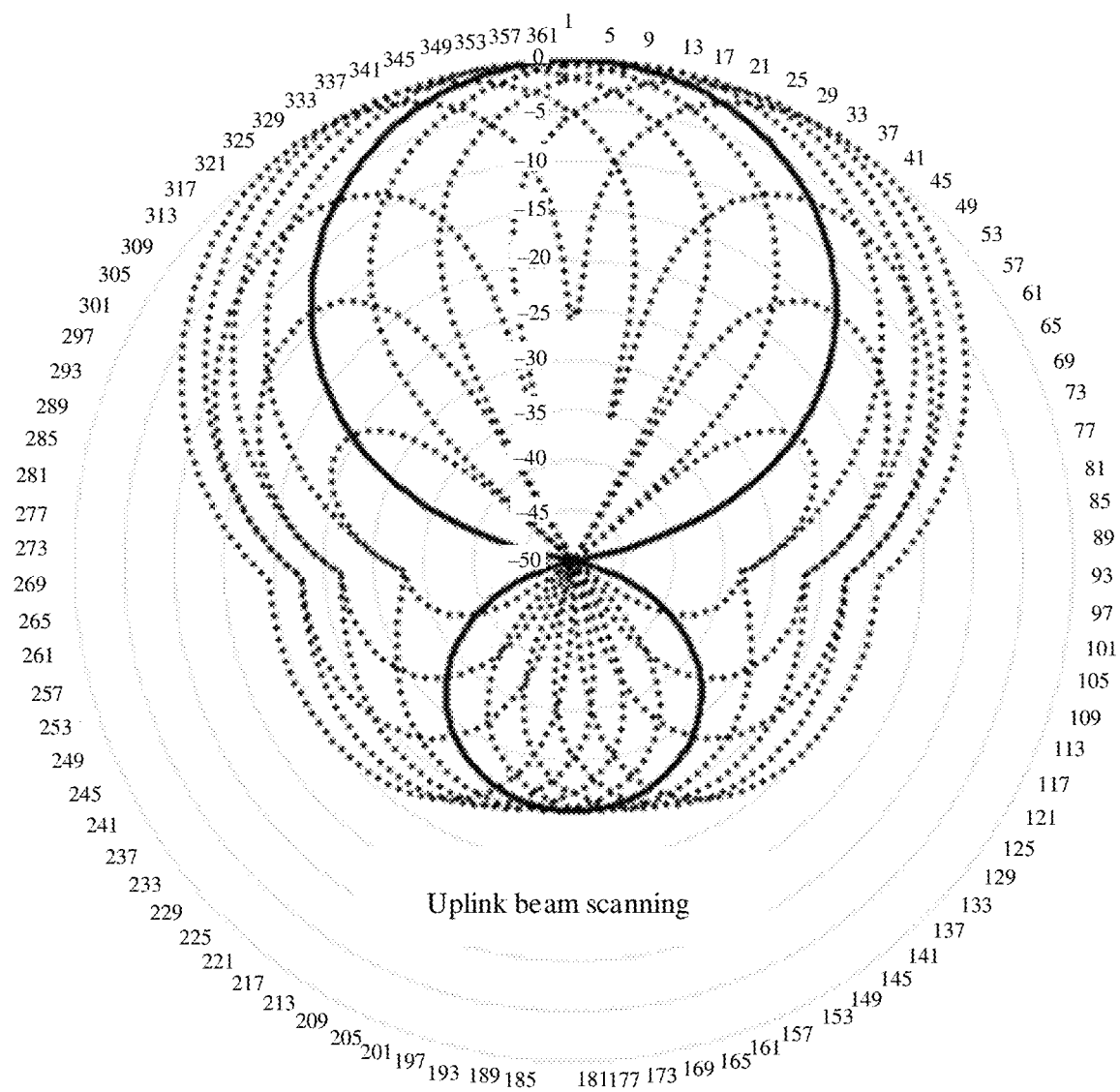
FIG. 8 is a schematic diagram of another pattern according to an embodiment of this application.

Uplink beams are used only for measurement, and for each polarization, dynamic scanning is performed on the eight beams, as shown in FIG. 8. A measurement periodicity is 2 s, and statistics is collected on energy values, for example, Eb values, of all users on the uplink beam within 2 s. Measurement on all uplink positive and negative polarization beams is completed within 32 s. Then, uplink and downlink beam pairing is performed.

It is assumed that the Eb values of all users on the uplink beams and sums of downlink DPCCH transmit powers are currently measured as follows:

TABLE 2

| | Eight patterns | | | | | | | |
|---|---|---|---|---|---|---|---|---|
| Phase difference | 0 | 45 | 90 | 135 | 180 | 225 | 270 | 315 |
| Normal sequence number | 1 | 2 | 3 | 4 | 5 | 6 | 7 | 8 |
| Downlink positive polarization (sequenced in ascending order of sums of DPCCH transmit powers) | 2 | 1 | 5 | 6 | 3 | 8 | 7 | 4 |
| Uplink positive polarization (sequenced in descending order of Eb values) | 5 | 4 | 1 | 3 | 8 | 7 | 2 | 6 |

TABLE 3

| | Eight patterns | | | | | | | |
|---|---|---|---|---|---|---|---|---|
| Phase difference | 0 | 45 | 90 | 135 | 180 | 225 | 270 | 315 |
| Normal sequence number | 1 | 2 | 3 | 4 | 5 | 6 | 7 | 8 |
| Downlink negative polarization (sequenced in ascending order of sums of DPCCH transmit powers) | 3 | 2 | 6 | 7 | 4 | 1 | 8 | 5 |
| Uplink negative polarization | 4 | 1 | 2 | 8 | 3 | 7 | 5 | 6 |

TABLE 3-continued

| | Eight patterns | | | | | | | |
|---|---|---|---|---|---|---|---|---|
| Phase difference | 0 | 45 | 90 | 135 | 180 | 225 | 270 | 315 |
| (sequenced in descending order of Eb values) | | | | | | | | |

Referring to Table 2 and Table 3, a beam 5 is selected for the target uplink positive polarization beam. Because an Eb value of a beam 4 is the largest for negative polarization, and orthogonal coverage of positive and negative polarization needs to be achieved, a beam orthogonal to the beam 4 is selected for negative polarization. Therefore, a beam corresponding to a phase difference, namely, mod(135+180, 360)=315, equal to a phase difference of the beam 4 plus 180 degrees is selected. In other words, a beam 8 is selected for the target uplink negative polarization beam.

Therefore, uplink and downlink beam pairing is completed, as shown in Table 4.

TABLE 4

| | Target uplink beam | Target downlink beam |
|---|---|---|
| Positive polarization | Beam 5 | Beam 2 |
| Negative polarization | Beam 8 | Beam 7 |

After uplink and downlink beam pairing is completed for the first time, a downlink beam is subsequently selected based on a change of an uplink beam. It is equivalently considered herein that a value of a phase difference between uplink and downlink channels is a stable value. Therefore, the following description is provided with reference to Table 4.

Currently, an uplink positive polarization beam 5 (a phase difference 180) corresponds to a downlink beam 2 (a phase difference 45). If an uplink positive polarization beam 3 (a phase difference 90 degrees) is selected for other periodical scanning, it is considered that a phase deviates by −90 degrees, and it is synchronously considered that a downlink phase deviates by −90 degrees. Therefore, mod(45+(−90, 360))=315 degrees needs to be selected for downlink positive polarization, and a downlink beam 8 needs to be selected. A downlink negative polarization beam is updated based on a same method.

Figure 9:
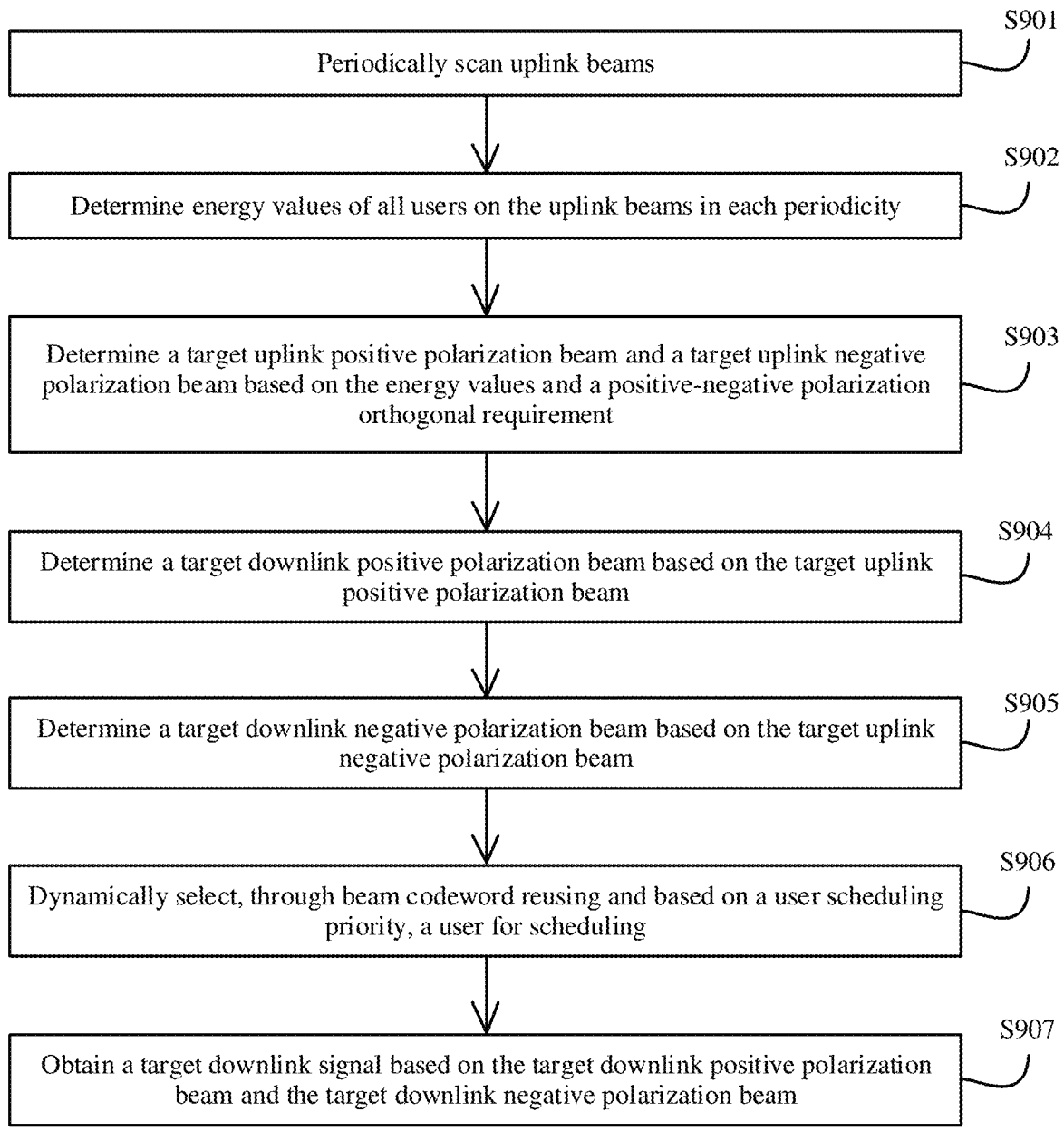
FIG. 9 is a flowchart of a multi-channel beamforming method according to still another embodiment of this application.

FIG. 9 is a flowchart of a multi-channel beamforming method according to still another embodiment of this application. As shown in FIG. 9, the multi-channel beamforming method in this embodiment may include the following steps.

S901. Periodically scan uplink beams.

S902. Determine energy values of all users on the uplink beams in each periodicity.

The energy values include an uplink positive polarization energy value and an uplink negative polarization energy value.

S903. Determine a target uplink positive polarization beam and a target uplink negative polarization beam based on the energy values and a positive-negative polarization orthogonal requirement.

S904. Determine a target downlink positive polarization beam based on the target uplink positive polarization beam.

S905. Determine a target downlink negative polarization beam based on the target uplink negative polarization beam.

S901 to S905 are respectively the same as S701 to S705, and details are not described herein again.

S906. Dynamically select, through beam codeword reusing and based on a user scheduling priority, a user for scheduling.

The beam codeword reusing is used to indicate that positive and negative polarization beams in a same cell use different codewords.

Optionally, this step may include: determining, based on the user scheduling priority, a first to-be-scheduled user currently having a highest priority; calculating, as a first energy value, an energy value that corresponds to the first to-be-scheduled user and that is received on the target uplink positive polarization beam; calculating, as a second energy value, an energy value that corresponds to the first to-be-scheduled user and that is received on the target uplink negative polarization beam; when a difference between the first energy value and the second energy value is greater than or equal to a first preset value, determining a second to-be-scheduled user currently having a second highest priority; calculating, as a third energy value, an energy value that corresponds to the second to-be-scheduled user and that is received on the target uplink positive polarization beam; calculating, as a fourth energy value, an energy value that corresponds to the second to-be-scheduled user and that is received on the target uplink negative polarization beam; and when a difference between the third energy value and the fourth energy value is less than or equal to a second preset value, determining to simultaneously schedule the first to-be-scheduled user and the second to-be-scheduled user on the target downlink positive polarization beam and the target downlink negative polarization beam.

S907. Obtain a target downlink signal based on the target downlink positive polarization beam and the target downlink negative polarization beam.

This step is the same as S302.

Figure 10:
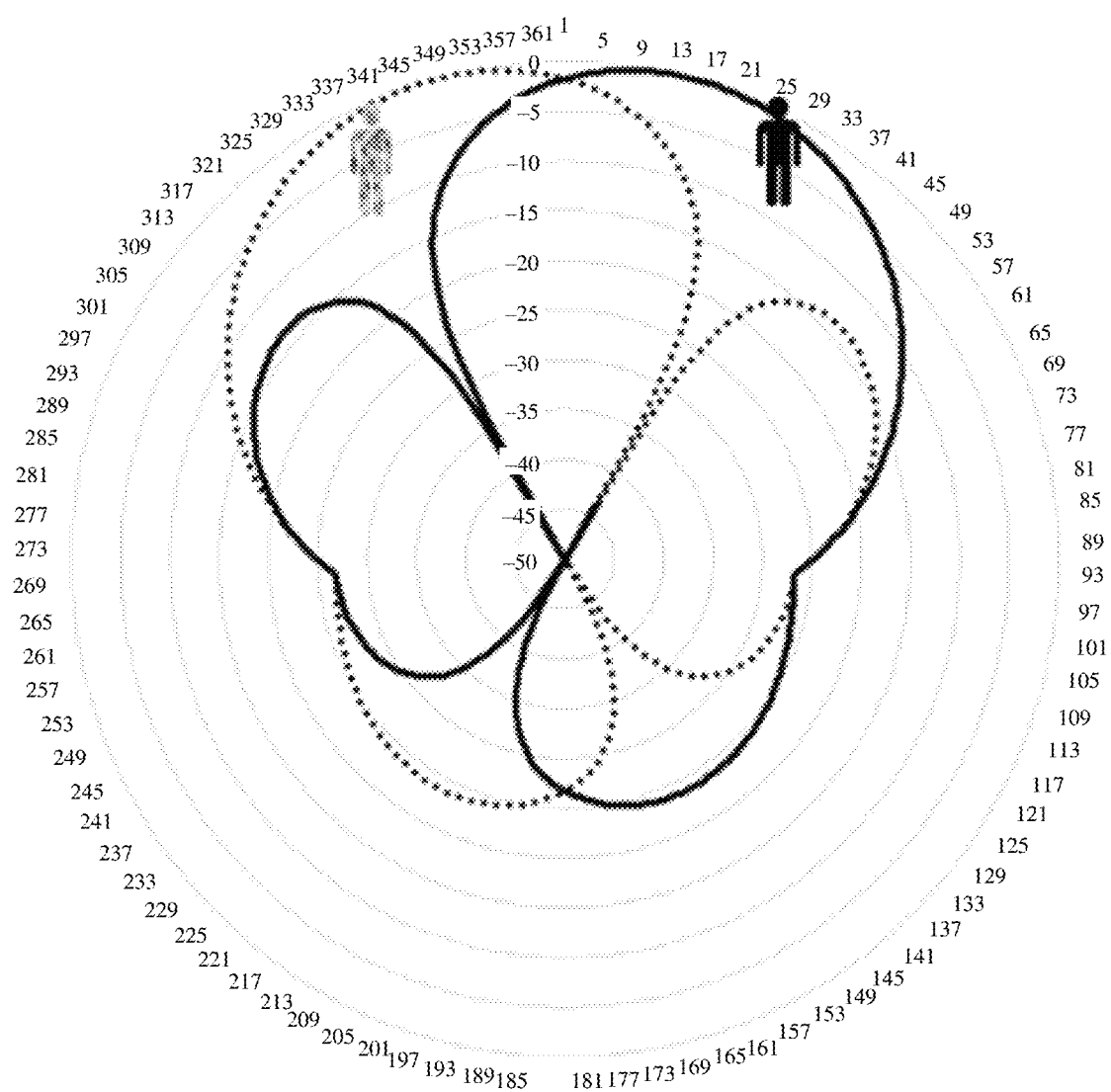
FIG. 10 is a schematic diagram of another pattern according to an embodiment of this application.

In this embodiment, after pairing between downlink orthogonal beams is completed and pairing between uplink and downlink beams is completed, a user is dynamically scheduled through codeword reusing. Specifically, a current to-be-scheduled user is selected based on a normal scheduling sequence of a cell. After the current high-priority to-be-scheduled user (namely, the first to-be-scheduled user) is determined, Eb values of the user received on uplink positive and negative polarization beams are calculated, and if a difference between the positive and negative polarization Eb values exceeds x dB (for example, 10 dB), a user (namely, the second to-be-scheduled user) is selected from the normal scheduling sequence of the cell again, to meet a condition that the positive and negative polarization Eb values is less than −x dB (for example, 10 dB). In this case, it may be considered that the two to-be-scheduled users are on two orthogonal beams, and the two users may be simultaneously scheduled, referring to FIG. 10.

If the foregoing condition is not met, only the first to-be-scheduled user is scheduled.

In the foregoing embodiment, a to-be-scheduled user is dynamically selected through beam codeword reusing, to increase a capacity gain. Compared with machine learning, beam codeword reusing can achieve a 20% to 30% capacity gain, to ensure network coverage and increase a capacity gain.

Simulation Experiment

If a first preset value is set to 10 dB, a proportion that can be used for scheduling through beam codeword reusing is 61.9%. In a Volcano propagation model, a capacity gain is approximately 20% to 30% through 3D electronic map simulation.

In the foregoing multi-channel beamforming method, on one hand, network coverage is ensured, and on the other hand, a capacity gain is increased. Therefore, competitiveness of a solution to a multi-channel scenario can be improved.

Figure 11:
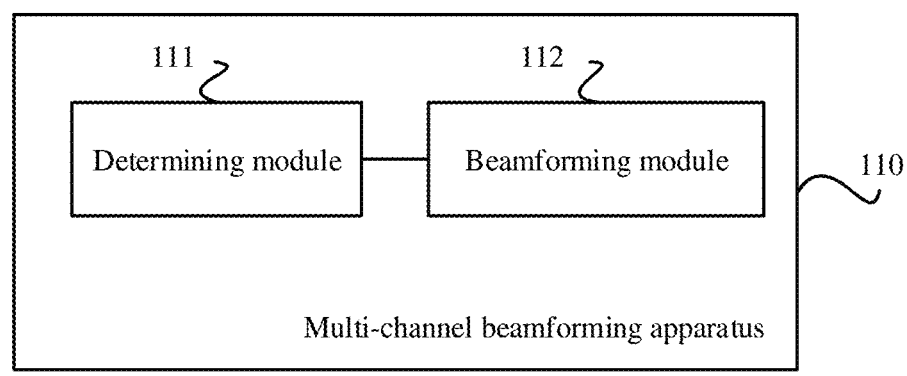
FIG. 11 is a schematic structural diagram of a multi-channel beamforming apparatus according to an embodiment of this application.

FIG. 11 is a schematic structural diagram of a multi-channel beamforming apparatus according to an embodiment of this application. As shown in FIG. 11, the multi-channel beamforming apparatus 110 in this embodiment includes a determining module 111 and a beamforming module 112.

The determining module 11 is configured to determine a target downlink positive polarization beam and a target downlink negative polarization beam based on M preset weight sets, where each weight set includes a phase weight set and an amplitude weight set, different weight sets include a same amplitude weight set, different weight sets include different phase weight sets, and both a quantity of phase weights in the phase weight set and a quantity of amplitude weights in the amplitude weight set are determined based on a quantity of a plurality of channels. M is an even number greater than 0.

The beamforming module 112 is configured to obtain a target downlink signal based on the target downlink positive polarization beam and the target downlink negative polarization beam.

In a feasible implementation, the determining module 11 may be specifically configured to perform the following substeps.

Substep 1. Perform beamforming on a to-be-transmitted signal based on the M preset weight sets, to obtain M beams. The M preset weight sets include N positive polarization weight sets and N negative polarization weight sets. A positive polarization weight set includes a positive polarization phase weight set, and a negative polarization weight set includes a negative polarization phase weight set. Each positive polarization weight set corresponds to one positive polarization beam, and each negative polarization weight set corresponds to one negative polarization beam. M is twice N.

Substep 2. Calculate a sum of DPCCH transmit powers of all users corresponding to each of the M beams. A sum of DPCCH transmit powers of all users corresponding to the positive polarization beam is a sum of positive polarization DPCCH transmit powers, and a sum of DPCCH transmit powers of all users corresponding to the negative polarization beam is a sum of negative polarization DPCCH transmit powers.

Substep 3. Determine a beam corresponding to a smallest sum of positive polarization DPCCH transmit powers in N sums of positive polarization DPCCH transmit powers as the target downlink positive polarization beam.

Substep 4. Determine, based on the target downlink positive polarization beam and N sums of negative polarization DPCCH transmit powers, the target downlink negative polarization beam paired with the target downlink positive polarization beam.

In a possible implementation, when performing the substep of "determining, based on the target downlink positive polarization beam and the N sums of negative polarization DPCCH transmit powers, the target downlink negative polarization beam paired with the target downlink positive polarization beam", the determining module 111 may be specifically configured to determine a beam corresponding to a smallest sum of negative polarization DPCCH transmit powers in the N sums of negative polarization DPCCH transmit powers as a first beam; and determine the target downlink negative polarization beam based on a positive-negative polarization orthogonal requirement, the first beam, and the target downlink positive polarization beam.

Further, the determining module 111 may be specifically configured to periodically scan uplink beams; determine energy values of all users on the uplink beams in each periodicity, where the energy values include an uplink positive polarization energy value and an uplink negative polarization energy value; determine a target uplink positive polarization beam and a target uplink negative polarization beam based on the energy values and the positive-negative polarization orthogonal requirement; and determine the target downlink positive polarization beam and the target downlink negative polarization beam respectively based on the target uplink positive polarization beam and the target uplink negative polarization beam.

Optionally, when determining the target uplink positive polarization beam and the target uplink negative polarization beam based on the energy values and the positive-negative polarization orthogonal requirement, the determining module 11 may be specifically configured to determine a beam corresponding to a largest uplink positive polarization energy value in N uplink positive polarization energy values as the target uplink positive polarization beam; determine a beam corresponding to a largest uplink negative polarization energy value in N uplink negative polarization energy values as a second beam; and determine the target uplink negative polarization beam based on the target uplink positive polarization beam, the positive-negative polarization orthogonal requirement, and the second beam.

Further, the multi-channel beamforming apparatus 110 may further include a selection module (not shown).

The selection module is configured to: before the beamforming module 112 obtains the target downlink signal based on the target downlink positive polarization beam and the target downlink negative polarization beam, dynamically select, through beam codeword reusing and based on a user scheduling priority, a user for scheduling. The beam codeword reusing is used to indicate that positive and negative polarization beams in a same cell use different codewords.

In some embodiments, the selection module may be specifically configured to: determine, based on the user scheduling priority, a first to-be-scheduled user currently having a highest priority; calculate, as a first energy value, an energy value that corresponds to the first to-be-scheduled user and that is received on the target uplink positive polarization beam; calculate, as a second energy value, an energy value that corresponds to the first to-be-scheduled user and that is received on the target uplink negative polarization beam; when a difference between the first energy value and the second energy value is greater than or equal to a first preset value, determine a second to-be-scheduled user currently having a second highest priority; calculate, as a third energy value, an energy value that corresponds to the second to-be-scheduled user and that is received on the target uplink positive polarization beam; calculate, as a fourth energy value, an energy value that corresponds to the second to-be-scheduled user and that is received on the target uplink negative polarization beam; and when a difference between the third energy value and the fourth energy value is less than or equal to a second preset value, determine to simultaneously schedule the first to-be-scheduled user and the second to-be-scheduled user on the target downlink positive polarization beam and the target downlink negative polarization beam.

The multi-channel beamforming apparatus described above in this embodiment may be configured to execute the technical solutions in the foregoing method embodiment. Implementation requirements and technical effects of the multi-channel beamforming apparatus are similar to those of the method embodiment. For functions of each module, refer to corresponding descriptions in the method embodiment. Details are not described herein again.

Figure 12:
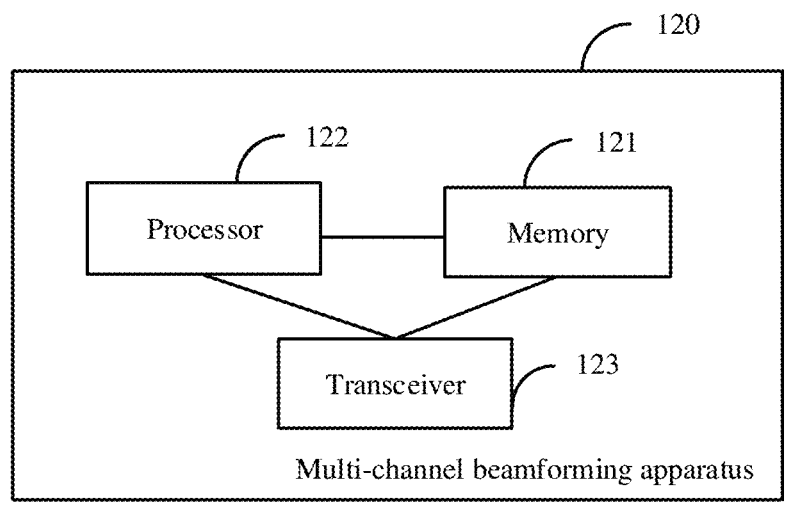
FIG. 12 is a schematic structural diagram of a multi-channel beamforming apparatus according to another embodiment of this application.

FIG. 12 is a schematic structural diagram of a multi-channel beamforming apparatus according to another embodiment of this application. As shown in FIG. 12, the multi-channel beamforming apparatus 120 in this embodiment includes a memory 121 and a processor 122.

The memory 121 is configured to store program code.

The processor 122 invokes the program code, and when the program code is executed, the processor 122 is configured to perform the method in any embodiment described above.

The multi-channel beamforming apparatus 120 may be specifically a base station.

Optionally, the multi-channel beamforming apparatus 120 may further include a transceiver 123 (which may include a receiver and a transmitter), configured to support communication between the multi-channel beamforming apparatus 120 and a terminal device, and receive and send information or an instruction in the foregoing method.

For detailed descriptions of the modules or units in the multi-channel beamforming apparatus 120 provided in this embodiment of this application and technical effects brought after the modules or units perform the method steps in any method embodiment of this application, refer to related descriptions in the method embodiment of this application. Details are not described herein again.

An embodiment of this application provides a multi-channel beamforming apparatus. The multi-channel beamforming apparatus has a function of implementing behavior in any method embodiment described above. The function may be implemented by hardware, or by hardware executing corresponding software. The hardware or software includes one or more modules corresponding to subfunctions of the function.

It should be noted that the multi-channel beamforming apparatus 120 may be a network device, or may be a chip that may be used in a network device.

An embodiment of this application provides a multi-channel beamforming apparatus, including at least one processing element (or chip) configured to perform the method process in any method embodiment described above.

An embodiment of this application further provides a chip, including a processing module and a communications interface. The processing module can perform the method process in any method embodiment described above. Further, the chip may further include a storage module (for example, a memory). The storage module is configured to store an instruction. The processing module is configured to execute the instruction stored in the storage module, and execution of the instruction stored in the storage module enables the processing module to perform the method process in any method embodiment described above.

An embodiment of this application provides a computer readable storage medium. The computer readable storage medium stores a computer program. The computer program includes at least one segment of code. When the at least one segment of code is executed by a processor, the processor is enabled to implement the method process in any method embodiment described above.

An embodiment of this application provides a program or a computer program product including a program instruction. When the program instruction is executed by a processor, the processor is enabled to implement the method process in any method embodiment described above.

All or a part of the program instruction may be stored in a storage medium packaged with the processor, or may be stored in a memory that is not packaged with the processor.

Optionally, the processor may be a chip.

The program instruction may be implemented in a form of a software functional unit and sold or used as an independent product, and the memory may be a computer readable storage medium in any form. Based on such understanding, all or a part of the technical solutions in this application may be embodied in a form of a software product, and includes several instructions for enabling a computer device, which may be specifically a processor, to perform all or some of the steps in the embodiments of this application. The foregoing computer readable storage medium includes: any medium that can store program code, such as a USB flash drive, a removable hard disk, a read-only memory (ROM), a random access memory (RAM), a magnetic disk, or an optical disc.

It should be noted that, in this embodiment of this application, module division is an example, and is merely a logical function division. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A method, comprising:
    determining a target downlink positive polarization beam and a target downlink negative polarization beam based on M weight sets, wherein each weight set of the M weight sets comprises a phase weight set and an amplitude weight set, different weight sets of the M weight sets comprise a same amplitude weight set, different weight sets of the M weight sets comprise different phase weight sets, and for each weight set of the M weight sets both a quantity of phase weights in the respective phase weight set and a quantity of amplitude weights in the respective amplitude weight set are determined based on a quantity of a plurality of channels, wherein M is an even number greater than 0, and the M weight sets are preset; and
    obtaining a target downlink signal based on the target downlink positive polarization beam and the target downlink negative polarization beam;
    wherein determining the target downlink positive polarization beam and the target downlink negative polarization beam based on the M weight sets comprises:
        performing beamforming on a to-be-transmitted signal based on the M weight sets, to obtain M beams, wherein the M weight sets comprise N positive polarization weight sets and N negative polarization weight sets, each positive polarization weight set of the N positive polarization weight sets comprises a positive polarization phase weight set, each negative polarization weight set of the N negative polarization weight sets comprises a negative polarization phase weight set, each positive polarization weight set of the N positive polarization weight sets corresponds to one positive polarization beam, and each negative polarization weight set of the N negative polarization weight sets corresponds to one negative polarization beam, wherein M is twice N;
        calculating a sum of dedicated physical control channel (DPCCH) transmit powers of all users corresponding to each of the M beams, wherein a sum of DPCCH transmit powers of all users corresponding to the one positive polarization beam is a sum of positive polarization DPCCH transmit powers, and a sum of DPCCH transmit powers of all users corresponding to the one negative polarization beam is a sum of negative polarization DPCCH transmit powers;
        determining a beam corresponding to a smallest sum of positive polarization DPCCH transmit powers in N sums of positive polarization DPCCH transmit powers as the target downlink positive polarization beam; and
        determining, based on the target downlink positive polarization beam and N sums of negative polarization DPCCH transmit powers, the target downlink negative polarization beam paired with the target downlink positive polarization beam.

2. The method according to claim 1, wherein determining, based on the target downlink positive polarization beam and the N sums of negative polarization DPCCH transmit powers, the target downlink negative polarization beam paired with the target downlink positive polarization beam, comprises:
    determining a beam corresponding to a smallest sum of negative polarization DPCCH transmit powers in the N sums of negative polarization DPCCH transmit powers as a first beam; and
    determining the target downlink negative polarization beam based on a positive-negative polarization orthogonal requirement, the first beam, and the target downlink positive polarization beam.

3. The method according to claim 1, wherein the method is performed by a base station.

4. The method according to claim 1, wherein the target downlink positive polarization beam and the target downlink negative polarization beam are orthogonal.

5. The method according to claim 1, wherein the method is performed by an access point.

6. An apparatus, comprising:
    a processor; and
    a memory coupled to the processor, wherein the memory stores instructions that, when executed by the processor, causes the apparatus to perform operations comprising:
        determining a target downlink positive polarization beam and a target downlink negative polarization beam based on M weight sets, wherein each weight set of the M weight sets comprises a phase weight set and an amplitude weight set, different weight sets of the M weight sets comprise a same amplitude weight set, different weight sets of the M weight sets comprise different phase weight sets, and, for each weight set of the M weight sets, both a quantity of phase weights in the respective phase weight set and a quantity of amplitude weights in the respective amplitude weight set are determined based on a quantity of a plurality of channels, wherein M is an even number greater than 0, and wherein the M weight sets are preset; and
        obtaining a target downlink signal based on the target downlink positive polarization beam and the target downlink negative polarization beam;
    wherein determining the target downlink positive polarization beam and the target downlink negative polarization beam based on the M weight sets comprises:
        periodically scanning uplink beams;
        determining energy values of all users on the uplink beams in each period, wherein the energy values comprise an uplink positive polarization energy value and an uplink negative polarization energy value;
        determining a target uplink positive polarization beam and a target uplink negative polarization beam based on the energy values and a positive-negative polarization orthogonal requirement;
        determining the target downlink positive polarization beam based on the target uplink positive polarization beam; and
        determining the target downlink negative polarization beam based on the target uplink negative polarization beam.

7. The apparatus according to claim 6, wherein the operations comprise:
    determining a beam corresponding to a largest uplink positive polarization energy value in N uplink positive polarization energy values as the target uplink positive polarization beam;

determining a beam corresponding to a largest uplink negative polarization energy value in N uplink negative polarization energy values as a second beam; and determining the target uplink negative polarization beam based on the target uplink positive polarization beam, the positive-negative polarization orthogonal requirement, and the second beam.

8. The apparatus according to claim 6, wherein the operations further comprise:

dynamically selecting, through beam codeword reusing and based on a user scheduling priority, a user for scheduling, wherein the beam codeword reusing indicates that positive and negative polarization beams in a same cell use different codewords.

9. The apparatus according to claim 8, wherein the operations further comprise:

determining, based on the user scheduling priority, a first to-be-scheduled user having a highest priority;

calculating, as a first energy value, an energy value that corresponds to the first to-be-scheduled user and that is received on the target uplink positive polarization beam;

calculating, as a second energy value, an energy value that corresponds to the first to-be-scheduled user and that is received on the target uplink negative polarization beam;

when a difference between the first energy value and the second energy value is greater than or equal to a first preset value, determining a second to-be-scheduled user having a second highest priority;

calculating, as a third energy value, an energy value that corresponds to the second to-be-scheduled user and that is received on the target uplink positive polarization beam;

calculating, as a fourth energy value, an energy value that corresponds to the second to-be-scheduled user and that is received on the target uplink negative polarization beam; and when a difference between the third energy value and the fourth energy value is less than or equal to a second preset value, determining to simultaneously schedule the first to-be-scheduled user and the second to-be-scheduled user on the target downlink positive polarization beam and the target downlink negative polarization beam.

10. The apparatus according to claim 6, wherein the apparatus is a base station.

11. The apparatus according to claim 6, wherein the target downlink positive polarization beam and the target downlink negative polarization beam are orthogonal.

12. The apparatus according to claim 6, wherein the apparatus is an access point.

13. The apparatus according to claim 6, wherein the instructions, when executed by the processor, cause the apparatus to perform operations comprising:

sequencing the uplink beams based on measurement values.

14. A non-transitory computer-readable storage medium storing a program that is executable by one or more processors, the program including instructions for:

determining a target downlink positive polarization beam and a target downlink negative polarization beam based on M weight sets, wherein each weight set of the M weight sets comprises a phase weight set and an amplitude weight set, different weight sets of the M weight sets comprise a same amplitude weight set, different weight sets of the M weight sets comprise different phase weight sets, and for each weight set of the M weight sets both a quantity of phase weights in the respective phase weight set and a quantity of amplitude weights in the respective amplitude weight set are determined based on a quantity of a plurality of channels, wherein M is an even number greater than 0, and the M weight sets are preset; and obtaining a target downlink signal based on the target downlink positive polarization beam and the target downlink negative polarization beam;

wherein determining the target downlink positive polarization beam and the target downlink negative polarization beam based on the M weight sets comprise instructions for:

performing beamforming on a to-be-transmitted signal based on the M weight sets, to obtain M beams, wherein the M weight sets comprise N positive polarization weight sets and N negative polarization weight sets, each positive polarization weight set of the N positive polarization weight sets comprises a positive polarization phase weight set, each negative polarization weight set of the N negative polarization weight sets comprises a negative polarization phase weight set, each positive polarization weight set of the N positive polarization weight sets corresponds to one positive polarization beam, and each negative polarization weight set of the N negative polarization weight sets corresponds to one negative polarization beam, wherein M is twice N;

calculating a sum of dedicated physical control channel (DPCCH) transmit powers of all users corresponding to each of the M beams, wherein a sum of DPCCH transmit powers of all users corresponding to the one positive polarization beam is a sum of positive polarization DPCCH transmit powers, and a sum of DPCCH transmit powers of all users corresponding to the one negative polarization beam is a sum of negative polarization DPCCH transmit powers;

determining a beam corresponding to a smallest sum of positive polarization DPCCH transmit powers in N sums of positive polarization DPCCH transmit powers as the target downlink positive polarization beam; and determining, based on the target downlink positive polarization beam and N sums of negative polarization DPCCH transmit powers, the target downlink negative polarization beam paired with the target downlink positive polarization beam.

15. The non-transitory computer-readable storage medium according to claim 14, wherein the instructions for determining, based on the target downlink positive polarization beam and the N sums of negative polarization DPCCH transmit powers, the target downlink negative polarization beam paired with the target downlink positive polarization beam, comprise instructions for:

determining a beam corresponding to a smallest sum of negative polarization DPCCH transmit powers in the N sums of negative polarization DPCCH transmit powers as a first beam; and determining the target downlink negative polarization beam based on a positive-negative polarization orthogonal requirement, the first beam, and the target downlink positive polarization beam.

16. The non-transitory computer-readable storage medium according to claim 14, wherein the non-transitory computer-readable storage medium is comprised in a base station.

17. The non-transitory computer-readable storage medium according to claim 14, wherein the target downlink positive polarization beam and the target downlink negative polarization beam are orthogonal.

18. The non-transitory computer-readable storage medium according to claim 14, wherein the non-transitory computer-readable storage medium is comprised in an access point.

* * * * *